Figure 1:
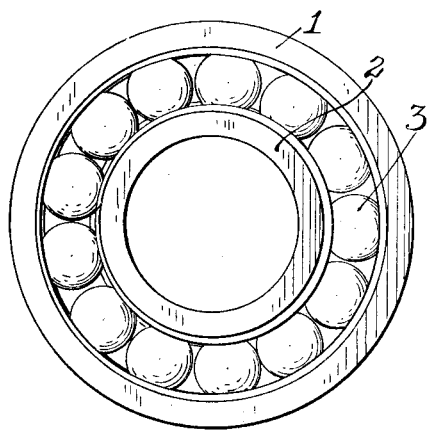

C. F. SULTEMEYER.
RADIAL BALL BEARING.
APPLICATION FILED MAY 11, 1914.

1,193,082.

Patented Aug. 1, 1916.
2 SHEETS—SHEET 1.

Witnesses
Robert M. Sulphen
J. M. Wynkoop

Inventor,
Charles F. Sultemeyer,
Knight Bros
Attorneys.

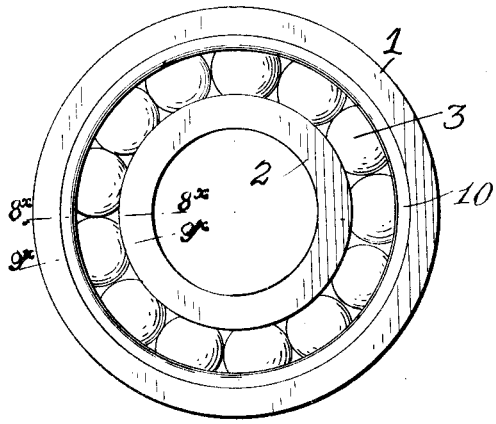
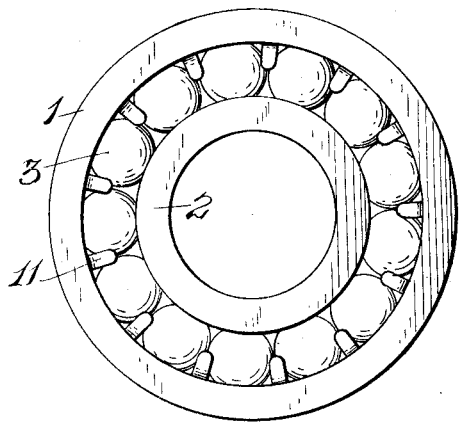
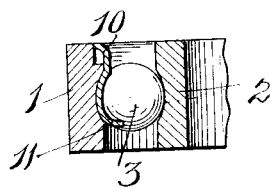
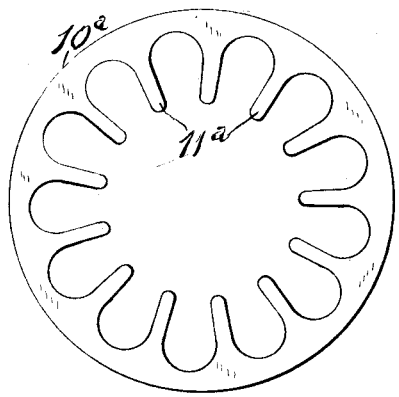
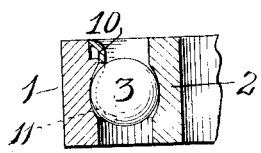

UNITED STATES PATENT OFFICE.

CHARLES F. SULTEMEYER, OF NORWICH, CONNECTICUT, ASSIGNOR TO GLOBE BALL BEARING CO., OF BROOKLYN, NEW YORK, A CORPORATION OF NEW YORK.

RADIAL BALL-BEARING.

1,193,082.  Specification of Letters Patent.  Patented Aug. 1, 1916.

Application filed May 11, 1914. Serial No. 837,811.

*To all whom it may concern:*

Be it known that I, CHARLES F. SULTEMEYER, a citizen of the United States, and resident of Norwich, in the county of New London and State of Connecticut, have invented certain new and useful Improvements in Radial Ball-Bearings, of which the following is a specification.

This invention relates to ball bearings in which raceways are provided in the opposed faces of two concentric rings, with balls confined therein, and particularly to that class of such bearings in which, notwithstanding the use of a substantially full complement of balls, the raceways and their confining walls are integrally continuous in the sense that they are without openings for the admission of the balls and without inserted portions to prevent the escape of the balls through an opening provided for their admission.

It has heretofore been proposed to assemble ball bearings of the type referred to, by availing of the inherent elasticity of the metal or other material of the rings. Thus it has been proposed to notch one or both of the raceways to a depth which, while permitting a ball to be forced through into its position between the raceways, will nevertheless leave a sufficient wall to prevent unintentional displacement of the ball; but this method is objectionable because leaving a shoulder in the raceway against which the balls may strike when resisting end thrust. It is also proposed to reduce one wall of one of the raceways uniformly, as by grinding concentrically with the axis, so as to leave a low projection for confining the balls, when in place, but so low that the balls could pass by springing the ring or rings within their limit of elasticity when forcing the reduced ring, axially into the plane of the circular row of balls previously arranged within the other ring; but this method left insufficient barrier to separation of the rings when subjected to excessive end thrust. It has also been proposed to make the reduction of the wall by a conical cut, eccentric to the ring, so that the cut extends from the highest point at one end of a diameter to the lowest point required for admission of the balls at the opposite end of the diameter and then to insert, first the higher side of the wall, within the circle of balls previously arranged in the other ring, and then swing the side with the lowest part of the wall upon the high side as pivot with the bevel ground surface wedging past the balls to cause the reduced wall to spring past the balls and bring the rings into the same plane; but this method of procedure is also objectionable, because it leaves the reduced ring so badly unbalanced as to develop unequal wear in use. All the methods referred to are objectionable in that the ball is liable to be injured in forcing it past the confining wall, either by the direct pressure upon the ball required to wedge the rings apart or by the impact of the ball upon the opposite walls of the raceway, when it snaps past the reduced walls and is shot forward by the resilient action of the rings upon the rear spherical faces of the balls; it being known that a flattening or indentation of a ball, even to an imperceptible degree, will act injuriously upon the raceway and impair the smoothness and consequently shorten the life of the bearing. Moreover, such bearings as heretofore constructed have not combined advantageously with spacing members, because leaving the ring portions of such members overlying the ball in a manner to obstruct inspection of them and accumulate foreign matter.

My invention avoids all of the disadvantages referred to by first cutting away, or reducing in an axial direction, and by a concentric cylindrical recess, the thickness of that one of the retaining walls, on one or both of the rings, which is to be subsequently ground, so as to reduce to a minimum any imbalance developed by eccentric grinding and leave on the outer ring a recess to receive the spacing ring. Then in making the radial reduction to admit the balls, the axially reduced wall alone is subjected to a cylindrical cut, parallel with the axis though eccentric thereto, so as to leave the wall as high as practicable throughout the greater portion of the raceway and at least for a distance sufficient to resist axial thrust in the direction of the reduced walls. Preferably, the reduction in an axial direction for such distance inward from the faces of the rings as will leave only the thickness required to sustain the axial thrust on the bearing, is effected at the time of originally forming the ring, or at any rate before tempering, and the eccentric cut made by grinding being upon this axially reduced wall, there is not only the advantage of leaving the difference in mass at opposite ends of the diameter relatively slight, but the amount of grinding required and consequently one item of expense in the production of the ring is greatly reduced. The rings thus produced are assembled by expanding the outer one, by heat, relatively to the inner ring and bringing them to place relatively to the previously located balls, while the one is so expanded.

The invention will be fully understood upon reference to the accompanying drawings in which—

Figure 2:
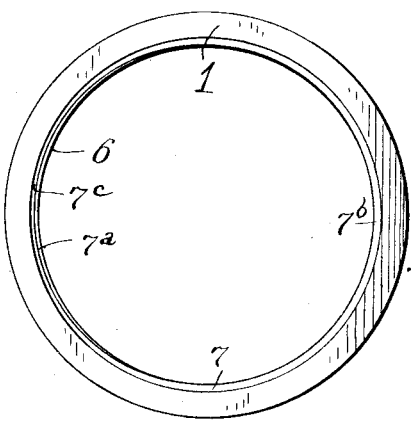
Figure 3:
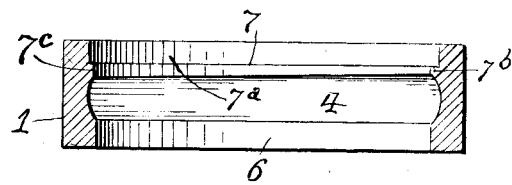
Figure 4:
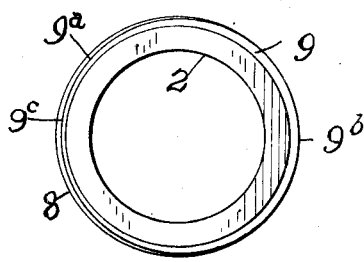
Figure 5:
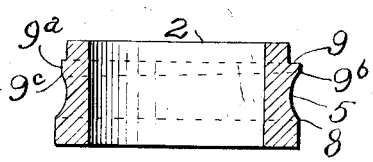

Figure 1 represents an assembled bearing containing a full complement of balls, which my invention aims to produce; Fig. 2 is a face view of that side of the outer ring carrying the wall reduced for passing the balls; Fig. 3 is a diametric section of the outer ring with the reduced wall uppermost; Fig. 4 is a face view of that side of the inner ring carrying the wall reduced for the admission of the balls; Fig. 5 is a diametric section of the inner ring with the reduced wall uppermost; Fig. 6 is a view similar to Fig. 1, showing the spacing ring in place; Fig. 7 is a view of the opposite side of the bearing shown in Fig. 6; Figs. 8 and 9 are sections taken, respectively, on the lines $8^x$ and $9^x$, Figs. 6 and 7, and Fig. 10 is a plan view of the blank from which the spacing member is constructed.

1 represents the outer ring, 2 the inner ring and 3 the balls confined in the raceways 4 and 5 of said rings. The outer ring has a normal confining wall 6 and a confining wall 7 which is reduced in axial thickness by a cylindrical cut $7^a$ concentric with the ring and then reduced in height by cutting or grinding in radial directions, about a center other than that of the true center of the ring, so as to reduce said wall 7 from a point $7^b$ of greatest radial dimension, to a diametrical point $7^c$ of least radial dimension. The eccentric grinding or reduction is preferably cylindrical, though it may be conical.

The ring 2 may be left with normal walls or with one normal and one reduced wall; and the reduced wall may be reduced axially only, or both axially and eccentrically. When reduced in both directions, it has one normal confining wall 8 and a confining wall 9 which is reduced in axial thickness by a cut $9^a$ concentric with the true center of the ring, and by cutting or grinding in radial directions about a center other than the true center of the ring 2, is reduced radially from a point $9^b$ of greatest height to a diametrically opposite point $9^c$ of least height. The rings thus prepared are introduced one within the other, and displaced eccentrically to admit as many balls as will enter without forcing, after which they are restored to their concentric relation, with the highest points of their reduced raceway walls and the lowest points of said walls, respectively coinciding. The remaining balls are then introduced at the low points of the ground walls, by forcing them in under pressure sufficient to spring the ring or rings. Or the full complement of balls may be arranged around the inner ring and the outer ring heated to a degree to develop necessary expansion, and then placed over the assembled balls, high side first and the low side afterward, by swinging about the high side as a pivot.

As stated, the concentric axial reduction $7^a$ and $9^a$ serve the double purpose of reducing to a minimum the mass of the eccentric portions of the confining walls affected thereby, and providing seats to receive and stop-shoulders to position the spacing member when used. Such a spacing member is illustrated in Figs. 6 to 10, wherein 10 represents the ring and 11 the fingers entering between and embracing small circles of the balls. These parts are preferably struck up from a circular disk of metal radially cut to leave an integral annulus $10^a$ with inwardly extending tongues $11^a$ of metal; the annulus being struck up to provide a concavo-convex part with an outer diameter corresponding to that of the axial recess of the outer ring and with its inner portion deflected inwardly to overlie said shoulder; the radial tongues being deflected through the outer series of inter-ball spaces and curved to embrace parts of small circles of the balls. By so disposing the ring, the bearing is left open for inspection and ready cleaning on both sides. By means of the recess, the ring of the spacing member is still further removed from obstructing position.

The confining walls will be continuous without abrupt changes in the height, and there will be ample radial dimension of the confining walls throughout a sufficient portion of the circumference, to sustain axial thrust upon the bearing in the direction of the reduced walls.

I claim:—

1. In a radial ball bearing, a ring having a raceway with a confining wall reduced radially and eccentrically sufficient to admit a ball by temporary change in the dimension of the ring, said reduction being cylindrical and reduced axially to limit the mass of the eccentric portion produced by the reduction first named.

2. A radial ball bearing comprising two rings having raceways with continuous confining walls; one of said walls being reduced eccentrically and radially to provide a low point at which to admit the ball by temporary change in the dimension of the ring; said wall being likewise reduced axially and concentrically with the ring to reduce the impairment of the equilibrium of the ring, both of said reductions being cylindrical.

The foregoing specification signed at New York, N. Y., this 23rd day of April, 1914.

CHARLES F. SULTEMEYER.

In presence of two witnesses:
RALPH ROYALL,
WALTER J. STEWART.

Copies of this patent may be obtained for five cents each, by addressing the "Commissioner of Patents, Washington, D. C."